United States Patent [19]

Slone, Jr. et al.

[11] Patent Number: 4,993,325
[45] Date of Patent: Feb. 19, 1991

[54] MAGNETIC FIELD GENERATOR

[75] Inventors: James C. Slone, Jr.; John A. Hudson; Bernard Deleman, all of Panama City, Fla.

[73] Assignee: The United States of America as represented by the Secretary of the Navy, Washington, D.C.

[21] Appl. No.: 59,796

[22] Filed: Jun. 2, 1970

[51] Int. Cl.$^5$ ............................................. F42B 22/42
[52] U.S. Cl. ........................................ 102/402; 324/345
[58] Field of Search ....................... 335/220, 223, 228; 324/1, 3, 5, 8, 345, 346; 310/113, 40.5, 233, 40.5, 233; 336/125, 128; 340/195; 342/14; 367/131; 102/402

[56] References Cited

U.S. PATENT DOCUMENTS

| 1,270,967 | 7/1918 | Mizer | 310/233 |
| 2,725,184 | 11/1955 | Mucci | 310/40.5 |
| 2,955,250 | 10/1960 | Shaw et al. | 324/330 |

Primary Examiner—Thomas H. Tarcza
Assistant Examiner—Daniel T. Pihulic
Attorney, Agent, or Firm—John Pecker; Harvey David; Sol Sheinbein

[57] ABSTRACT

This invention discloses a magnetic field generator employing a direct current electromagnetic coil which is swept through a predetermined area by a drive motor and transmission means. Circuit means are disclosed to periodically reverse the polarity of the generated magnetic field either in synchronism with the sweeping of the electromagnetic coil or at a time related frequency.

9 Claims, 5 Drawing Sheets

MAGNETIC FIELD GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains to a system used to sweep a magnetic field through the surface of the earth. Systems of this type may be used for geophysical exploration, in situ treatment of surface layers, and certain military and naval purposes.

Prior art arrangements employed for these purposes have utilized permanent magnets, or linear conductors and large area loops of a single conductor which have a high amperage electrical current flowing therein. Such conducting arrangements have limited ranges of angles at which their magnetic fields interact with the earth. The permanent magnetic devices of the prior art have limited magnetic strength. It is often times desirable to direct a high intensity magnetic field at an angle to the earth's surface, such as might characterize a geological strata when encountered on the surface. The prior art arrangements having large magnetic fields with useable ranges are difficult to direct and therefore require computations to consider only the portion of the total field directed in the desired direction.

As a further explanation of the background of the invention, an important military and naval application of the invention is providing a countermeasure sweep for a class of ordnance devices which are magnetically actuated so as to endanger all objects within a predetermined effective range including the activating instrumentality. Certain ones of these devices are activated by the change of magnetic flux along a single axis and may be armed by impact force and a timing mechanism. This arrangement facilitates aerial dropping of individual units in territory which is not under the control of the forces emplanting the devices. In such placements the devices bury themselves by impact force and are armed a predetermined time thereafter.

Devices of the aforedescribed type are particularly difficult to sweep when dropped on land or in shallow waters. Under such conditions, the devices become buried upon impact such that the axis of sensitivity lies at a variety of angular orientations with respect to the surface of the earth. Prior art methods and devices are not able to cause a great enough variation in magnetic field along all possible axis orientations to provide an effective sweeping action from a location sufficiently remote from the device to ensure operational safety.

SUMMARY OF THE INVENTION

The instant invention overcomes these disadvantages of the prior art by the provision of an electromagnetic sweep system. A disclosed electromagnetic transducer, a component part of the system of the invention, is designed to rotate about a mechanical axis which is inclined to the electromagnetic axis so as to cause the magnetic output thereof to move through a predetermined angular path. Further, the invention comprises a source of electrical energy effectively connected to the electromagnetic transducer for the supply of electric current thereto. A motive power means to move the electromagnetic transducer and a programmer means for altering the electrical current flowing from said source of electrical energy in a predetermined fashion complete the major operative components of the system of the invention.

Although the invention is described herein as it pertains to the minesweeping arts, it should be obvious that, as previously noted, other fields of endeavor may be benefited thereby. Geophysical applications, for example, might employ the system of the invention to generate high density magnetic fields to measure the permeability of geological strata.

With the foregoing in mind, it is an object of this invention to provide an improved magnetic sweep system.

Further, this invention provides a system to direct magnetic fields into the surface of the earth.

A further object of this invention is the provision of an electromagnetic coil which is driven in a predetermined manner to sweep a magnetic field generated thereby through a predetermined volume.

A further object of this invention is the provision of a magnetic field generator having a very high intensity output which may be directed along predetermined directions.

A further object of this invention is the provision of a magnetic field generator which has a reversible magnetic polarity.

A further object of this invention is the provision of a magnetic field generator means that sweeps the magnetic field through a predetermined area while reversing the polarity of the magnetic field in synchronism with the sweep movement thereof.

Yet another object of the invention is the provision of a magnetic field generator which reverses the polarity of the magnetic field generated in a time dependent fashion.

A further object of this invention is the provision of a magnetic field generator which sweeps the magnetic field generated thereby through a predetermined angular area while reversing the polarity thereof in a predetermined time dependent sequence.

A further object of this invention is the provision of a system for sweeping magnetic mines with randomly oriented axes of sensitivity.

A still further object of this invention is the provision of an electromagnetic sweep which is useful on land as well as in shallow waters.

A still further object of this invention is the provision of an electromagnetic system which is programmed to traverse a predetermined rotational sequence, as well as a predetermined electrical sequence.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
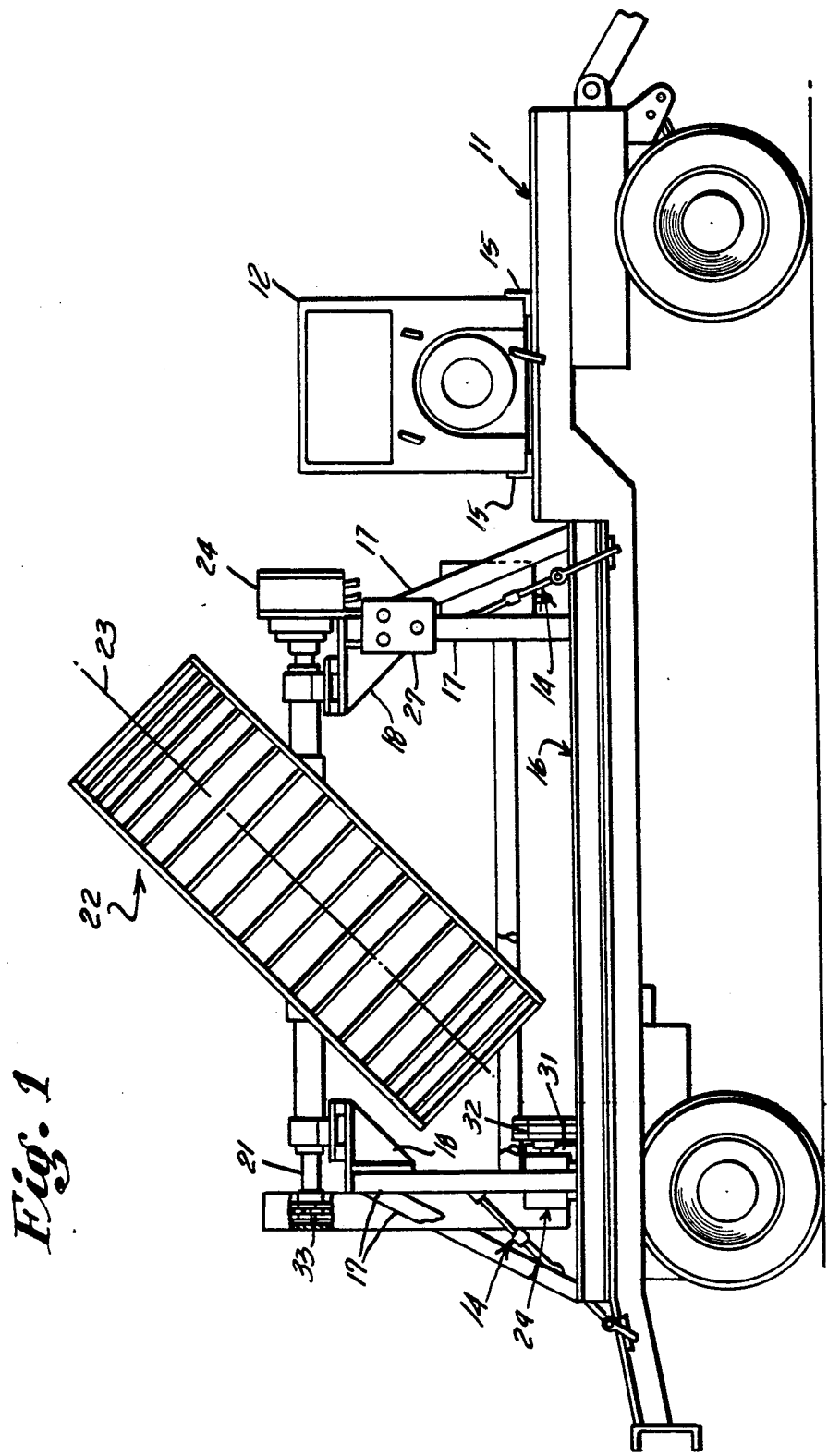
FIG. 1 is a side elevation view of an embodiment of the invention adapted for land use.

Referring to FIG. 1, a preferred embodiment of the system of the invention is shown in side elevation. A pneumatic tired trailer 11 serves as a mobile support platform for a direct current electrical generator 12 and the electromagnetic transducer assembly 13. Electromagnetic transducer assembly 13 is secured to trailer 11 by means of a plurality of tensioning turnbuckles and pendant assemblies 14. Generator 12 is secured to trailer 11 by a special mount 15 fabricated of angle stock to be integral with trailer 11.

Generator 12 is driven by a suitable source of motive power which is contained within the housing thereof. Examples of motive power units proven to be successful in such application include gasoline and diesel power reciprocating engines and gas turbine or other rotary heat engines. Since the specific power source used to drive generator 12 has no direct bearing on the system of the invention, it will not be further described.

Electromagnetic transducer assembly 13, comprises a base 16 with generally vertical end members 17 which converge to form suitable bearing supports 18. Bearings 19, atop bearing supports 18, are axially aligned to support axle 21 for rotation therein. Axle 21 is horizontally disposed and is attached to coil assembly 22 to rotate it therewith.

Coil assembly 22 comprises a single winding of large diameter insulated electrical conductor wound in a suitable coil form means. The diameter of the coil is large in comparison to its thickness. Because of such a construction, the electrical properties of coil assembly 22 may, for the purposes of this description, be considered as having originated by a plane coil having a plane corresponding to the median plane 23 of assembly 22 as indicated by broken line in FIG. 1.

The precise number of turns required in the winding will depend upon the strength of the magnetic field desired and the electrical specifications of direct current electrical generator 12. The coil turns and wire size may, therefore, be selected by a person who is skilled in the electrical design arts in accordance to well known design parameters. As an example, the winding may consist of sixteen layers of sixteen turns each of 600 MCM aluminum conductor. Aluminum is used throughout in the construction of coil assembly 22, as it is in all areas of the system, for purposes of weight reduction.

Figure 2:
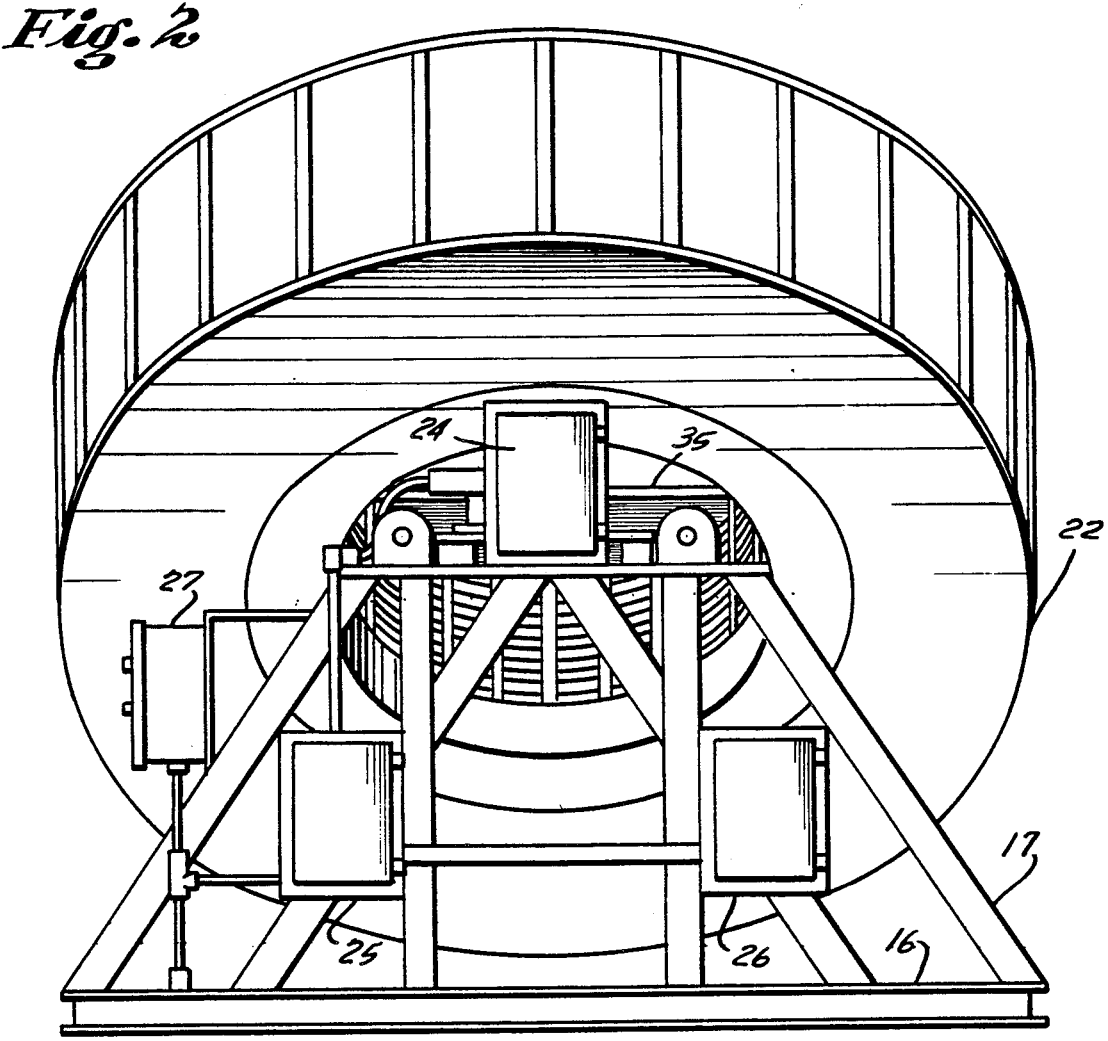
FIG. 2 is an end elevation of the coil component of the invention showing the mounting details of the control components of the system.

As will be observed, median plane 23 of coil assembly 22 makes an acute angle with axle 21. When axle 21 is rotated within bearings 19, coil assembly 22 is carried therewith such that the magnetic field produced thereby is caused to precess about the axis of revolution, i.e., axle 21. This field impinges the earth and aligns with a variety of angles so as to produce the desired magnetic interaction with the earth. Referring to FIG. 2, other mechanical details of the system of the invention are shown. On one end member 17, remote from the drive mechanism, slip ring assembly 24 is mounted. Slip ring assembly 24 permits electrical power to be applied to coil assembly 22 during rotation thereof. On the same end member 17 control unit 25 and timed polarity reversing mechanism 26 are mounted. The functions of control unit 25 and polarity reversing mechanism 26 will be more completely explained in connection with FIG. 5 herein. A switch panel 27 and a synchronism control switch 28 complete the control units located at the control end of electromagnetic transducer assembly 13. Synchronism control switch 28 is closed by a cam on axle 21 once each revolution thereof.

Figure 3:
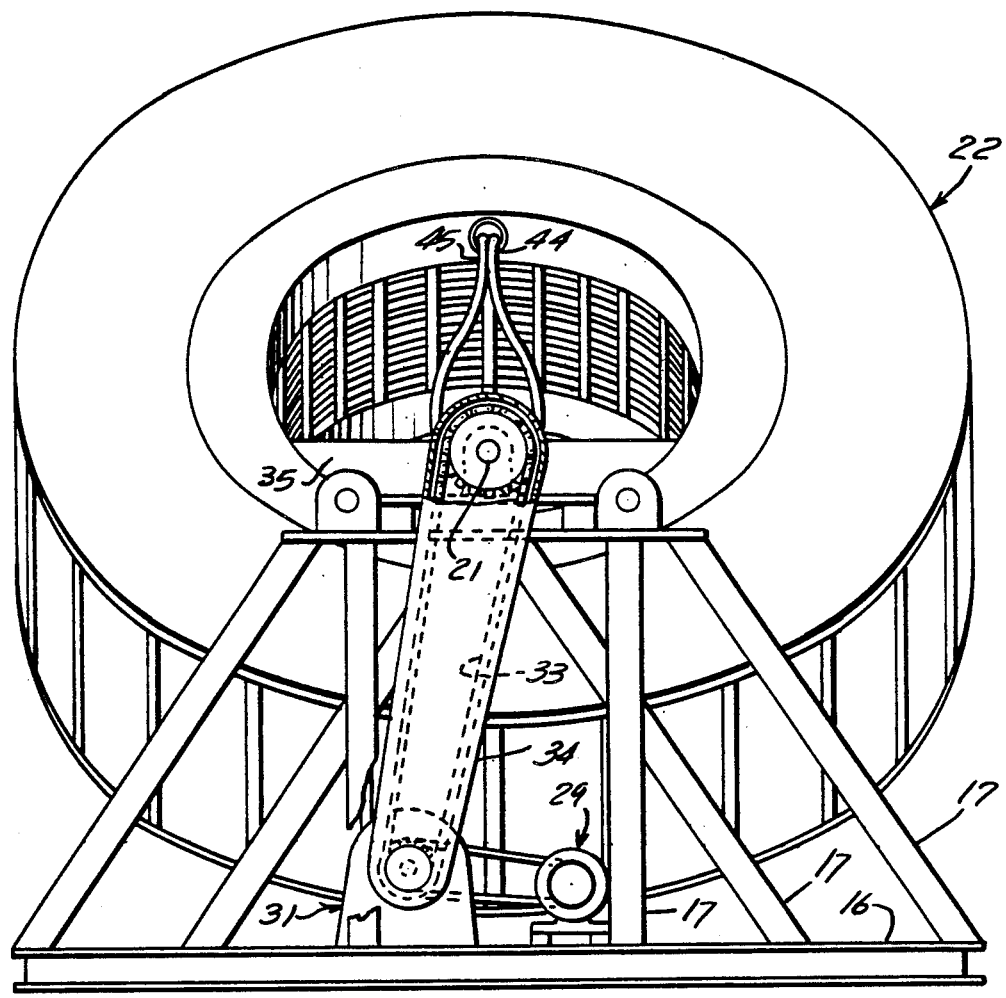
FIG. 3 is an end elevation of the coil component of the invention showing the drive components and the details of their interconnection.

FIG. 3 illustrates the drive arrangements at the end member 17 opposite the one mounting the control units. As illustrated, motor and clutch unit 29 are connected to speed reducing transmission 31 via belt 32. Roller chain 33 drives axle 21 via appropriate sprocket thereon and on transmission 31. Chain 33 is enclosed within guard 34 for operational safety considerations.

Coil assembly 22 may be secured to axle 21 by means of plates 35 and gussets 36 which are fabricated to be a portion of the inner wall of the center aperture through which axle 21 passes. Other arrangements may, of course, be employed. Since the weight of the coil is considerable, even though fabricated of aluminum, alternate mountings must be strong enough to withstand the rotational stress of coil movement about axle 21. One such alternate mounting arrangement is shown at FIG. 4.

Figure 4:
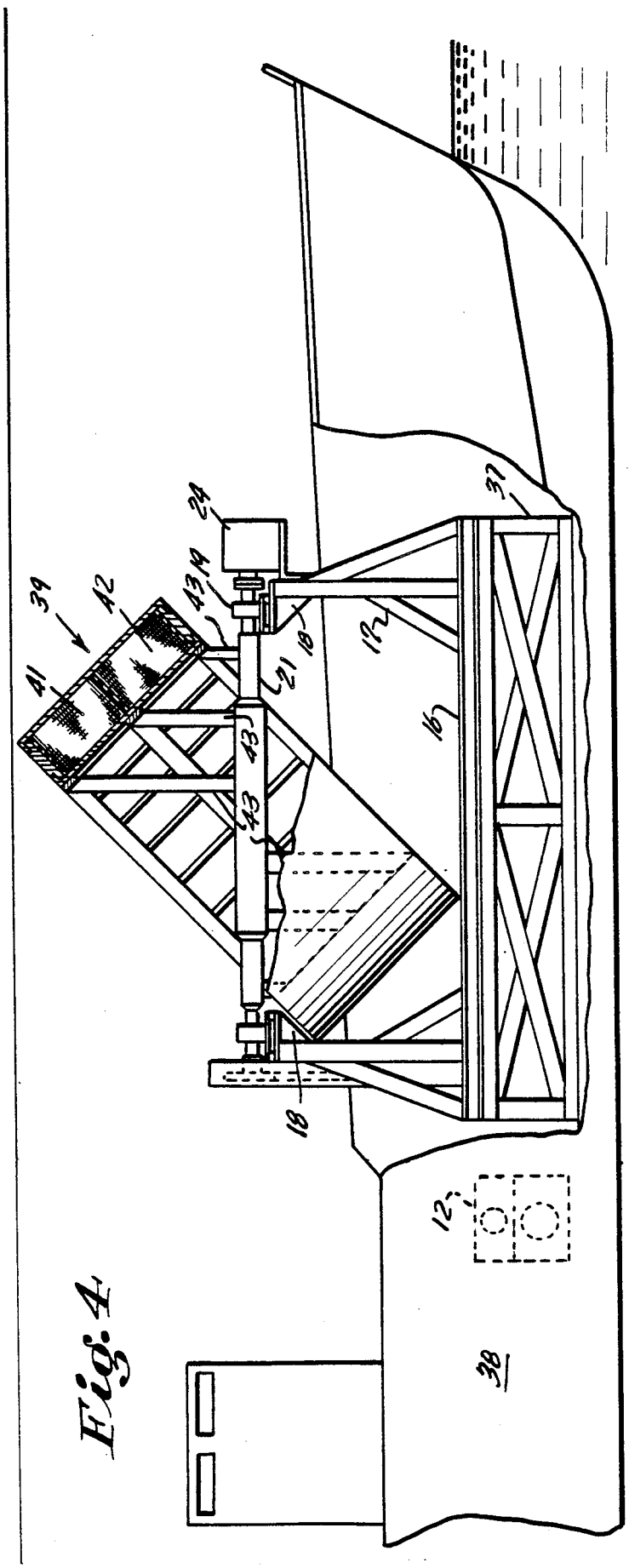
FIG. 4 is a side elevation in partial section so as to show a form of the invention particularly adapted for mounting in a shallow draft watercraft.

FIG. 4 illustrates how the system of the invention may be mounted to sweep shallow water environments with a magnetic field. The arrangement is essentially the same as shown in FIG. 3 and described above, and components having the same reference numerals perform the identical functions in both arrangements. As shown, base 16 rests on a platform 37 constructed in the hold space of a shallow hull watercraft 38. Generator 12 may be mounted below decks in a sheltered portion of the vessel.

In some instances, trailer 11 may be simply loaded and secured within a shallow draft watercraft, such as a landing craft, for example. In such cases, the system of the invention is operated as if it were ashore.

It will be observed that coil assembly 39 differs from coil assembly 22 in having two windings 41 and 42. Each of these windings may be considered as essentially the same as the single winding of coil assembly 22, and the additional coil may be powered by separate generator means, not shown, mounted elsewhere in watercraft 38. The duplication of coils and power sources permits, of course, a greater flexibility of the system in programming and field strengths which may be used. These refinements of use are obvious to skilled operators in adapting the disclosed system for a particular application and are unnecessary for the understanding of how one may make and use the device, and, accordingly, not discussed in greater detail herein.

Rather than the plate and gusset mounting arrangement discussed above, coil assembly 39 is mounted to axle 21 by means of radial spokes 43. Spokes 43 may serve as enclosed passageways for the leads from windings 41 and 42. In the arrangement of FIG. 3, conductors 44 and 45, which are connected to slip ring assembly 24 through the hollow center of axle 21, are exposed in the central aperture of coil assembly 22.

Figure 5:
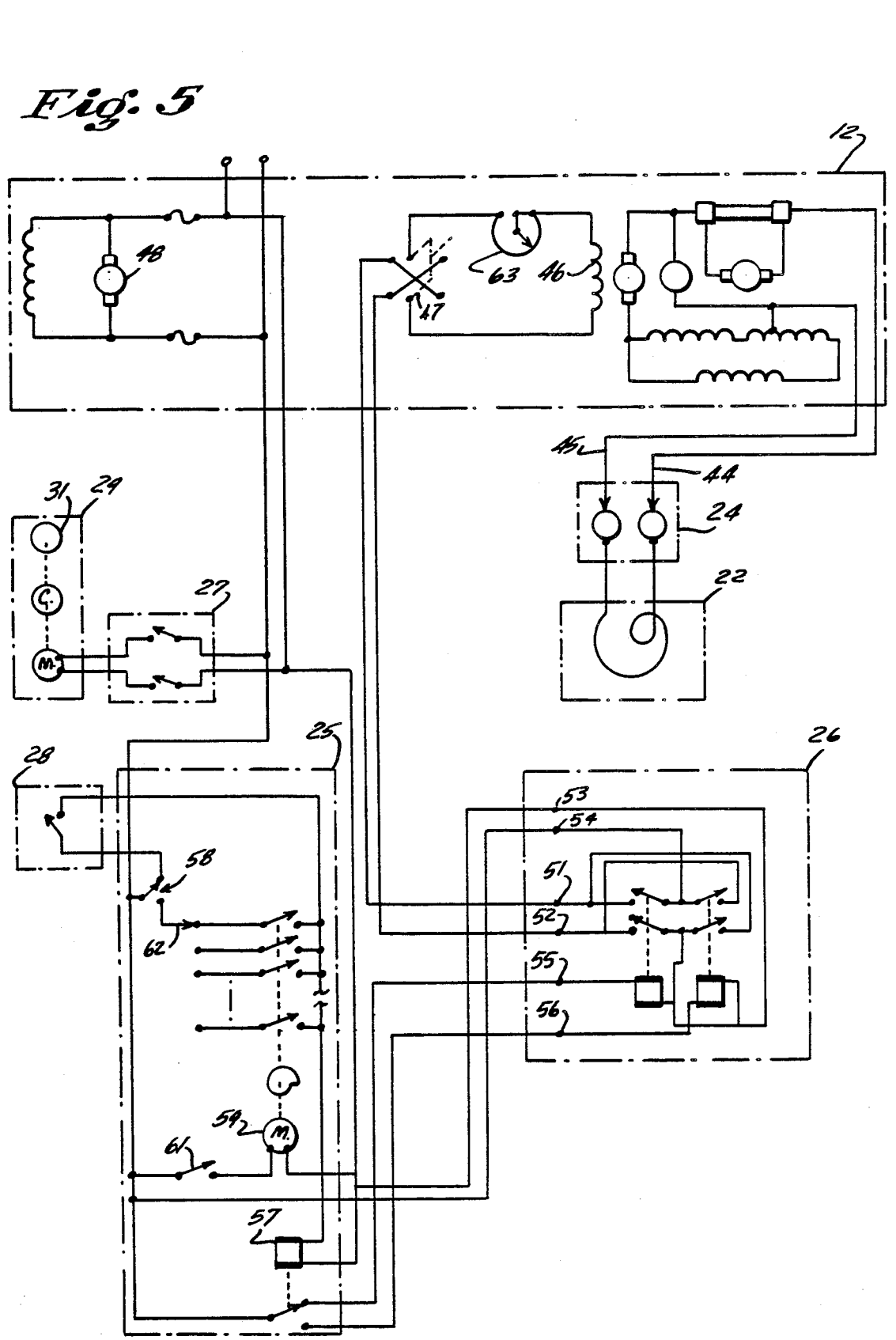
FIG. 5 is a schematic diagram of the electrical circuit of the system of the invention.

FIG. 5 illustrates the electrical interconnection of the aforedescribed components and the circuit details of the system of the invention. As will be recognized by one versed in the electrical arts, generator 12 is of a general configuration commonly employed for high amperage direct current generation. Such units frequently find application as welding generators. The output of such units are regulated by an electrical current, termed exciter current, which is applied to a shunt field winding 46. A switch 47 is provided for determining the polarity of the exciter current. Switch 47 is customarily connected directly to the exciter armature 48.

In sweeping operations magnetic field reversals from coil assembly 22 are oft times required more frequently than can be readily accomplished with switch 47. For this reason, the exciter field is applied via controller 25 and polarity reversing mechanism 26. These units together with synchronism control switch 28 provide for a plurality of self reversing modes of operation in a manner to be described.

It will be noted that the exciter voltage is also fed from armature 48 via control unit 25 and switch panel 27 to motor-clutch unit 29. This circuit, of course, furnishes power to rotate coil assembly 22 via transmission 31, as previously described.

The actual reversing of the polarity is effected by polarity reversing mechanism 26. This unit is a standard relay switching unit and selectively joins either load terminals 51 to line terminal 53 and load terminal 52 to line terminal 54, or load terminal 51 to line terminal 54 and load terminal 53 to line terminal 53. This selection is controlled by energizing either control terminal 55 or 56. Control terminals 55 and 56 are sequentially energized by each actuation of ratchet relay 57 in control unit 25.

Control unit 25 also contains a switch 58 which in one position thereof is connected in circuit with ratchet relay 57 and synchronism control switch 28. When switch 28 is in the position as shown, this connection is effective to energize ratchet relay 57 each time synchronism control switch 28 is closed. Since this occurs once each revolution of electromagnetic transducer assembly 13, the magnetic field reverses itself once each revolution thereof.

Control unit 25 also contains a motor driven, eight bank, cam actuated switch 59. The individual contacts of motor cam switch 59 close momentarily at time intervals determined by the contours of the actuating cams. Intervals of 3.7, 4.7, 6.2, 7.5, 9.4, 12.5, 18.8, and 37.5 seconds have proven useful in development models of the invention, however, other intervals may be used, if desired. The motor for motor-cam switch 59 is connected to switch 61 to be energized by the closing thereof. Switch 61 and 58 may be ganged together, if desired, at some sacrifice of operational flexibility.

When switch 58 is thrown to its other position from its illustrated position and switch 61 is closed, ratchet relay 57 is energized each time a selected one of the contacts of motor cam switch 59 is closed. The particular contact which is effective to energize relay 57 is determined by the position of an eight position selector switch 62 connected between the contacts of motor cam switch 59 and switch 58. This position of switch 58, the timed position, permits the control of the reversal rate of the magnetic at a rate which is independent of its rotational velocity by selecting an appropriate time rate by means of selector switch 62.

It will be observed that a variable resistance 63 is placed in series with shunt field 46 to control the output of the generator 12. This resistance will control the strength of the magnetic field generated by coil assembly 22 to a predetermined value.

Using the foregoing description, a person who is skilled in the electrical arts can make the system of the invention. Of course, certain modifications and structural refinements will suggest themselves to such skilled artisans when adapting the invention to their specific requirements. The construction and use of the system of the invention will be further facilitated by the following description of the method of utilization and operation.

DESCRIPTION OF THE PREFERRED MODE OF OPERATION

The system of the invention is operated by a single operator. First the vehicle supporting the system, either trailer 11 or watercraft 38, is positioned where the magnetic field is desired. Generator 12 is started and, if a stationary field is desired, coil assembly 22 is positioned to direct the field in the desired direction. The positioning may be accomplished manually or by use of motor control switch panel 27. Switch 58 is placed in the illustrated position such that the polarity of the field is controlled through synchronism control switch 28. If the polarity of the field is the reverse of that desired, switch 47 is thrown to obtain the desired polarity.

If a swept magnetic field with sweep related reversal of the polarity is desired, the unit is operated as described above, but with motor-clutch unit 29 left in operation by use of control switch panel 27.

If a swept magnetic field without polarity reversal is desired, motor clutch unit 29 is energized to drive coil assembly 22 or 39. Switch 58 is placed in the timed position, the other position than that illustrated, and switch 61 is placed in the illustrated, or open, position. In this mode of operation, the field polarity may still be reversed manually with switch 47 to make the field of the desired polarity.

If a timed reversal of the magnetic field is desired, switch 58 is placed in the timed position. Switch 61 is closed to energize the cam-motor switch 59 drive means, thereby causing rotation thereof to momentarily close the contacts thereof in a time sequence as determined by their actuating cam profiles. Selector switch 62 is placed in a position to select the desired time interval.

The timed sequence of operation may be used with a swept field or a stationary field depending on whether or not motor-clutch unit 29 is energized.

The foregoing description taken together with the appended claims constitute a disclosure such as to enable a person skilled in the electrical engineering arts and having the benefit of the teaching contained therein to make and use the invention. Further, the structure herein described meets the aforestated objects of invention and constitutes a meritorious advance in the magnetic field generation arts which is unobvious to a person not having the benefit of the teachings contained herein.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A magnetic field generating means comprising in combination:

coil assembly means for generation of a magnetic field in response to electrical current flowing therein;

axle means attached to said coil assembly means and passing through the center thereof for rotatable support thereof;

bearing means on opposite sides of said coil assembly means and journaled about said axle means for rotatably supporting said axle means therein;

support means attached to said bearing means for support thereof, along with said axle means and said coil assembly means carried therewith;

drive means effectively attached to said axle means for selective rotation thereof within said bearing means, said drive means including an electric motor and a speed reduction means effectively interconnecting the output of said electric motor and the aforesaid axle means for the transmission of rotational driving energy thereto;

generator means electrically connected to said coil assembly means for supplying electrical current thereto; and control means electrically connected to said generator means for reversing the direction of the current output thereof to thereby reverse the polarity of the magnetic field produced by said coil assembly means.

2. A magnetic field generating means according to claim 1 in which said coil assembly means comprises a plurality of multiturn and multilayer coils of electrical conductors.

3. A magnetic field generating means according to claim 1 in which said axle means is joined to said coil assembly means at a predetermined angle with respect to the plane thereof.

4. A magnetic field generator means according to claim 1 in which said support means further comprises in combination:

base means having a generally horizontal configuration for support and weight distribution purposes; and two end members extending joined to opposite ends of said base means and extending vertically therefrom and attached to said bearing means for supporting said axle means at a predetermined distance from said base means.

5. A magnetic field generator according to claim 1 in which the connections between said electric motor and said speed reduction means, and between said speed reduction means and the aforesaid axle means are effected by endless flexible drive means.

6. A magnetic field generator means according to claim 1 in which said control means comprises a manually actuated switch connected to said generator means so as to effect said polarity reversal by manual actuation.

7. A magnetic field generator means according to claim 6 in which said control means further comprises switch means mechanically connected to the aforesaid axle means for actuation thereby in response to angular rotation thereof and electrically connected to said generator means to effect the aforesaid current reversal thereof.

8. A magnetic field generator according to claim 6 further comprising:

motor driven switch means having a plurality of contacts momentarily closed at different intervals of time; and selector switch means connected to said motor driven switch means for selection of one contact thereof, and also effectively connected to said generator means to effect the aforesaid current reversal in response to the closure of the selected one contact of said motor driven switch means.

9. A magnetic field generator according to claim 8 further comprising:

first switch means mechanically connected to said axle means for actuation thereby in response to a predetermined angular rotation thereof; and second switch means connected between said first switch means, said selector switch means, and the aforesaid generator means for selectively effecting the aforesaid current reversal thereof by either actuation of said first switch means or actuation of the selected one of said motor drive switch contacts.

* * * * *